United States Patent [19]

Wamsley, Jr.

[11] Patent Number: 4,842,622

[45] Date of Patent: Jun. 27, 1989

[54] GAS/LIQUID/SOLIDS SEPARATOR

[76] Inventor: Robert H. Wamsley, Jr., 7755 Praver Dr., E., Jacksonville, Fla. 32217

[21] Appl. No.: 176,355

[22] Filed: Mar. 31, 1988

[51] Int. Cl.⁴ ............................................. B01D 19/00
[52] U.S. Cl. ........................................ 55/216; 55/319; 55/337; 55/398
[58] Field of Search .......... 55/216, 319, 337, 171–177, 55/398, 399

[56] References Cited

U.S. PATENT DOCUMENTS

| | | | |
|---|---|---|---|
| 3,246,451 | 4/1966 | Glasgow | 55/174 X |
| 3,378,993 | 4/1968 | Veres et al. | 55/337 X |
| 3,418,789 | 12/1968 | Hoffman et al. | 55/337 X |
| 3,722,184 | 3/1973 | McMinn | 55/174 |
| 3,845,840 | 11/1974 | Thrasher | 55/337 X |
| 4,668,254 | 5/1987 | Wamsley | 55/216 |

Primary Examiner—Charles Hart

[57] ABSTRACT

The apparatus includes a swirl vanes device for reducing the velocity of exhaust fumes fed into an enclosed container with the accompanying direction and volume changes enhancing the separation of the exhaust into gas, liquid, and solid components. Solids and liquids collect in the container and gas passes out through a demister filter. With engines having a pressurized crankcase exhaust and an air box outlet, an eductor assembly employing a spring-biased check valve is used to control the entrance of crankcase exhaust into an inlet chamber having a low pressure created by the volume expansion of inlet air box exhaust. A liquid overflow system has a floatable ball valve to remove liquid from the container under conditions of high liquid levels. An inlet and outlet manifold houses a spool valve for the selective control and isolation of the inlet and outlet openings of the container so that the container may be pressurized to remove the liquid collected therein. For some "V"-Block engines a pair of oppositively disposed air box and pressurized crankcase inlets are used each having an eductor assembly for control of crankcase exhaust flow into the container and into a partitioned inlet chamber to provide effective isolation therebetween.

38 Claims, 6 Drawing Sheets

GAS/LIQUID/SOLIDS SEPARATOR

BACKGROUND OF THE INVENTION

1. Field of the Invention

The present invention relates to a gas/liquid/solids separator and more particularly to improvements in a separator designed to separate oil, carbon, and gases in the exhaust fumes of an internal combustion engine.

2. Prior Art

In internal combustion engines, and especially in diesel engines, exhaust fumes containing oil, carbon, and water must be removed from the engine and disposed in an environmentally sound manner. In addition, many diesel engines run with a pressure in the crankcase to assist with the venting of potentially explosive oil vapors. These exhaust fumes must also be safely and properly handled. The container and separator apparatus must beable to deal with wide variability in the amount and content of the exhaust fumes and particularly with regard to liquids. The separator apparatus must be able to handle high liquid flows without creating high back pressure against the engine exhaust.

The present invention provides several improvements over the invention disclosed in U.S. Pat. No. 4,668,254, dated May 26, 1987. In one aspect an eductor with a check valve allows exhaust fumes to enter from a pressurized crankcase. In another aspect, a swirl vanes device improves the volume and velocity changes needed to more efficiently and effectively separate liquids and solids from gases. A further aspect relates to a float ball valve assembly which allows for liquids removal at high liquid levels and provides a method to pressurize the container for rapid, forced expulsion of liquids from the container at abnormally high liquid levels.

SUMMARY OF THE INVENTION

In accord with the present invention there is provided an apparatus for separating gas from liquid and solid matter in the exhaust from an internal combustion engine which includes an enclosed container for liquid and solid matter having a top wall, a bottom wall, and side wall and having a first inlet for exhaust, a first outlet for liquid and a second outlet for gas; the first exhaust inlet has an exhaust passageway through the side wall and a discharge port inside the container communicates with a swirl vane device for suddenly changing the direction of and materially reducing the velocity of and increasing the path of the exhaust being discharged through such port; the first liquid outlet has a liquid passageway through the side wall with a shutoff valve in such liquid passageway; the second gas outlet has a gas passageway through the top wall; a filter means is spaced below the second gas outlet to remove entrained liquid and solid matter from the exhaust while passing therethrough with the gases passing out the second gas outlet; and means for selectively closing the gas passageway in the second gas outlet to raise the pressure of the exhaust in the container.

Several aspects of the invention are provided by the swirl vanes device which includes a plurality of laterally directed swirl vanes, a base affixed to lower edges thereof for directing the exhaust laterally outwardly to cause the exhaust to change direction and increase in volume whereby its velocity is decreased and a cylindrical skirt is mounted concentrically around and spaced laterally outwardly from the swirl vanes and is suspended from a top partially overlying such swirl vanes for directing exhaust from the vanes downwardly to enhance the separation of the exhaust. The aforementioned top extends horizontally outwardly against the side wall of the container and has a plurality of spaced holes between the skirt and the side wall that allow for the free flow of exhaust upwardly therethrough with the major portion of liquids and solids remaining thereneath. The top is affixed to the upper edges of the swirl vanes for supporting the vanes and the base within the container. A baffle is mounted below the filter means and extends in overlying position over the holes to cause substantial changes in direction of the exhaust before passing through the filter means, and such baffle includes a circumferential edge affixed to the side wall and an interior perimeter edge defining an enlarged opening extending laterally inward a sufficient distance to change the direction of the exhaust passing upwardly through the holes prior to passing into the filter means through the enlarged opening. The baffle further includes an interiorly disposed downwardly tapered portion defining the opening for increasing the flow path of exhaust from the holes.

In yet other aspects, the means for selective closing of the gas passageway in the second gas outlet includes a spool valve means formed by a disk and a handle operatively connected to the disk such that when the handle is lifted vertically the disk closes the passageway. The liquid passageway includes a vertically disposed cylindrical tube communicating with the liquid outlet and the liquid collection within the container. A third outlet for liquid has a liquid passageway through the top wall with a shutoff valve on the inlet which forms a seat for the ball valve. The ball valve rises off the seat when a sufficiently high liquid level exists in the container.

In other aspects of the present invention, a check valve means is used for controlling the passage of an additional second exhaust into the container, the second exhaust entering the inlet of the discharge port when the second exhaust is at a sufficiently high pressure to open the check valve means with the assistance of a low pressure created in the inlet of the discharge port by the first exhaust passing therethrough. The check valve means includes a seat, a circular disk, and biasing means connected to the disk for normally biasing the disk toward and to seat against the seat.

An inlet and exhaust manifold includes valve control means for controlling the flow through the first liquid outlet and the second gas outlet. This valve control means preferably includes a spool valve having a first upper disk for selectively opening and closing the second gas passageway in the second gas outlet and a second lower disk for selectively opening and closing the first liquid passageway, the disks cooperating such that as the upper disk is operated to close the second gas passageway, the second disk opens the first liquid passageway. The valve also includes a third disk for isolating the first inlet from the second inlet and a fourth disk for isolating the liquid outlet from the first inlet. The disks are mounted in fixed relative positions on a vertical rod having an upper end portion passing through the manifold with a handle thereon. The first and second disks define a chamber within the manifold which communicates with the gas outlet when flow through the gas passageway is closed by the first disk for allowing passage of exhaust entering the chamber from the second inlet to flow through the gas outlet.

Additional aspects are seen in which the check valve means is used as part of an eductor which may be located inside the container or externally as a separate assembly in some engines, two eductors may be used, one on each side of the container, having outlets forming a partitioned chamber.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENT

Figure 1:
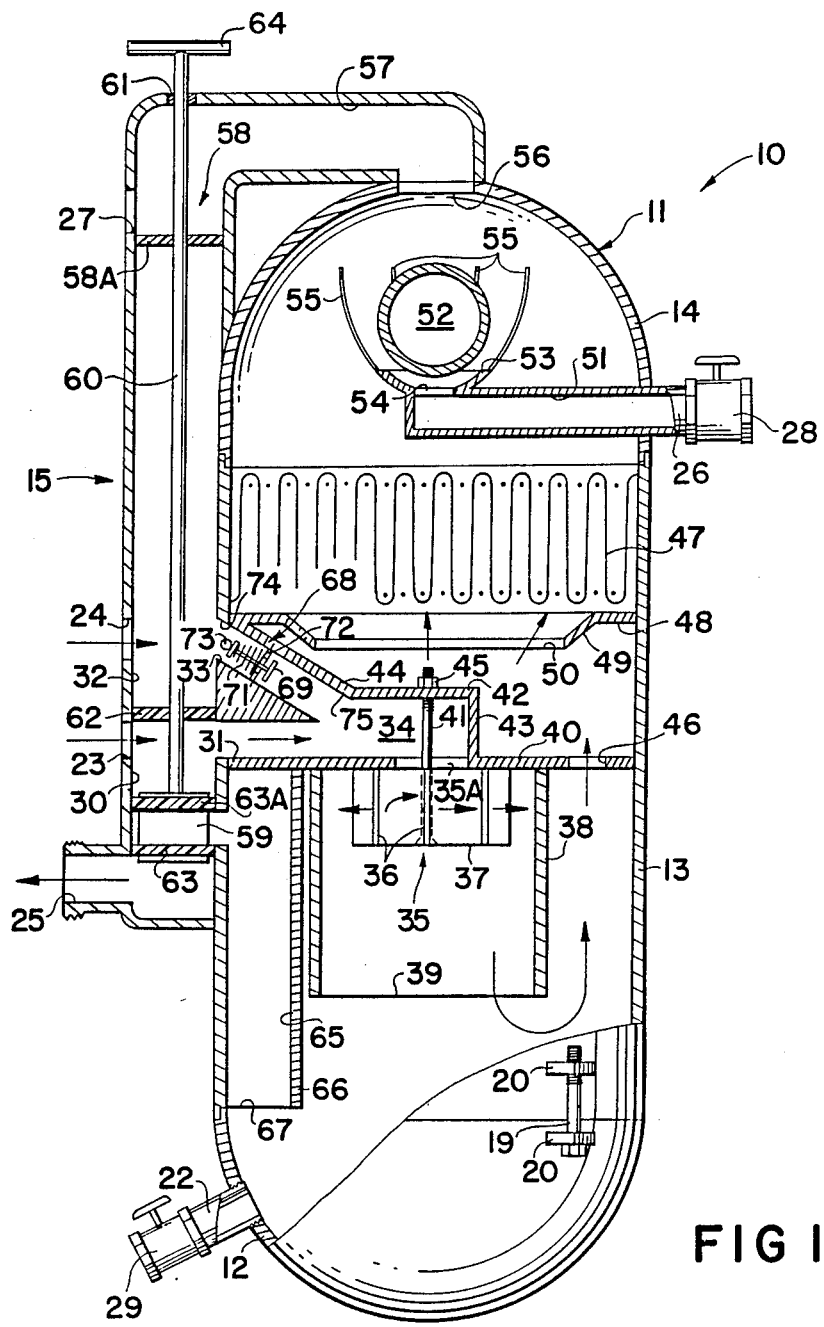
FIG. 1 is a cross-sectional view of the improved gas, liquids, solids separator in accord with a first embodiment of the present invention.
Figure 10:
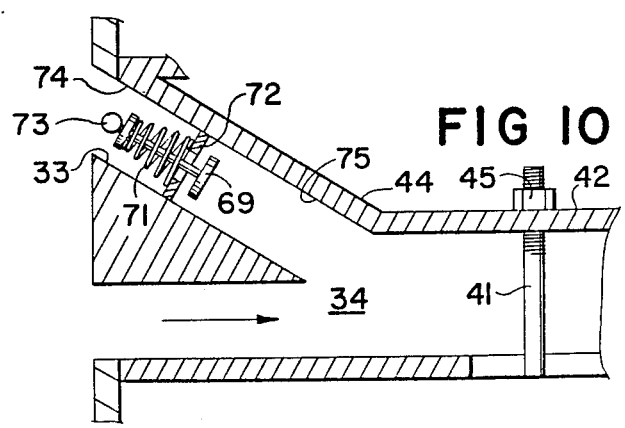
FIG. 10 is an enlarged cross-sectional view of the eductor used in the present invention.

Referring now to the drawings the improved gas, liquids, and solids separator is designated generally by numeral 10 in FIG. 1. A receiving tank or container 11 has a hemispherical bottom wall 12, a cylindrical side wall 13, a hemispherical top wall 14 and an inlet and outlet manifold 15 secured adjacent the middle and top side walls 13, 14 respectively. The top wall 14 is secured to side wall 13 by way of conventional flanges 17 and bolts 16 and the bottom wall 12 is connected to sidewall 13 via similar flanges 20 and bolts 19. Preferably there are four bolt/flange fittings at the top and four bolt/flange fittings at the bottom which, in conjunction with and lower 0-rings (not shown) provide a leak-tight pressure seal.

The separator 10 is designed to separate engine exhaust gases into gas, liquids, and solid components and selectively remove each component as desired. Accordingly, liquid test drain outlet 22 with isolation valve 29 is used to determine the level of water and/or oil in the container 10. Oil drain outlet 25 is used to remove oil that collects in the container 10 and will generally float on any water level present. Outlet 25 directs any oil to the appropriate waste collection apparatus. In the event of very high levels of oil and/or water in the container the overflow outlet 26 with normally open isolation valve 28 provides a path for overflowing liquids to a collection apparatus. Gas outlet 56 through top wall 14 directs gas from the exhaust to the atmosphere, or to the engine air intake, or any appropriate collection facility.

A first exhaust inlet 23 receives engine exhaust from an air box and directs the exhaust into inlet chamber 30. From there the exhaust is directed into passageway 31 where it will flow into a larger chamber 34 where it undergoes a volume expansion. Chamber 34, defined by circular upper wall 42 and cylindrical side wall 43, directs the exhaust downwardly through opening 35A into swirl vanes assembly 35 comprising a series of swirl vanes 36 mounted on a lower base 37 and suspended from an upper support plate 40. Bolt 41 and nut 45 are used to secure the swirl vanes assembly 35 to upper support plate 40. Support plate 40 is affixed to the side wall 13 by welding or any other suitable manner. It is to be understood that swirl vanes 36 may be integrally cast with support plate 40 as a single unit. The swirl vanes assembly 35 is used to provide additional direction and volume changes for the gas exhaust and any entrained solids and liquids. The base 37 directs the exhaust laterally where it is directed downwardly again by cylindrical skirt 38 which is affixed to upper support plate 40. The exhaust exits skirt 38 via outlet opening 39 where it makes a U-turn which further aids in the removal of solids and liquids from the exhaust gas. Upper support plate 40 has a plurality of openings 46 located laterally the skirt 38.

Gas entering the portion of the container above support plate 40 is directed into demister 47 for further removal of liquids and solids. Demister 47 is a conventional filter comprising wire mesh, crumpled metal or fibrous strands as understood in the art. Gas enters the demister 47 via opening 50 in demister baffle 48. A downwardly directed inward portion 49 of baffle 48 is located vertically above openings 46 in the support plate 40. Accordingly, the gas is more evenly directed into the demister and undergoes another directed change which further assists in removing entrained liquids. Gas exiting above demister 47 will exit through opening 56 in top wall into passageway 57 which leads to gas outlet 27.

If high levels of water and/or oil exist in the container, float ball 52 will be lifted off seat 53 allowing liquids to flow through opening 54 into passageway 51 and out through overflow outlet 26. Ball cage 55 prevents ball from coming to rest other than on seat 53. If very high levels of liquid fill up the container because they enter faster than they can be removed, ball 52 may seat against opening 56. In such a case, the gas outlet 27 is closed with the result that the pressure within container 10 can increase rapidly, thereby forcing liquid out through overflow outlet 26.

Normally oil is removed via oil drain outlet 25 via tubular space 65 comprised of wall 66 which is affixed to side wall 13. The lower opening 67 into space 65 is located a a sufficient distance above any level of solids that may collect against bottom wall 12.

Oil exits through oil drain outlet 25 when lower spool valve body 59 having disks 63 and 63A is lifted via rod 60 and handle 64. When handle 64, sealed with packing 61, is lifted vertically by an operator, the upper gas isolation disk 58A will shut off gas outlet 27 causing a pressure increase in container 10 with the result of forcing oil out through oil drain outlet 25. The size of lower spool valve body 59 is chosen to prevent a complete closure of airbox inlet passageway 31 when the spool valve assembly 58 is operated.

In many small engines, the crankcase is pressurized to assist in the venting of dangerous explosive vapors and second exhaust inlet 24 from the crankcase is used. Crankcase exhaust enters inlet chamber 32 and is directed into a passageway 33 having a check valve 69 biased normally closed against seat 72. The spring 71, and stem 73, is secured against spring base 70 in a conventional manner. The exhaust enters passageway 33 via inlet 74 from inlet chamber 32. The gas entering chamber 34 from airbox inlet passageway expands and results in a lower pressure in chamber 34 than in inlet 23. The passageways 31 and 33 with chamber 34 form an eductor assembly 68. If crankcase exhaust pressure is sufficiently high, the differential pressure across the eductor assembly 68 will cause check valve 69 to open sending crankcase exhaust through outlet 75 into chamber 34 where the separation process, as previously described, is accomplished. Isolation disk seal 63A separates airbox inlet 23 from oil drain outlet 25. Airbox inlet 23 and crankcase inlet 24 are separated by isolation disk seal 62.

One method of removing liquid from the container 11 is substantially the same as that described in U.S. Pat. No. 4,668,254. Generally, this method consists of completely closing an outlet gas valve which causes pressure to increase, thus forcing liquid up the tubular space 65 and out of the container 11. In the present invention however, liquid drainage can more safely be accomplished by insuring that adequate removal of pressurized crankcase fumes from an engine is accomplished at all times during a liquid removal operation. When handle 64 is lifted by an operator to open oil outlet 25 and close upper gas outlet opening 27 some of the crankcase gases will be exhaused directly from crankcase exhaust inlet chamber 32 out through gas outlet 27 thus ensuring adequate gas removal from the engine during liquid removal.

Solids are removed from the container 11 by periodically removing the bottom wall 12 and manually breaking up collected carbon and debris or by incorporating a breakup apparatus similar to that disclosed in U.S Pat. No. 4,668,254.

Figure 5:
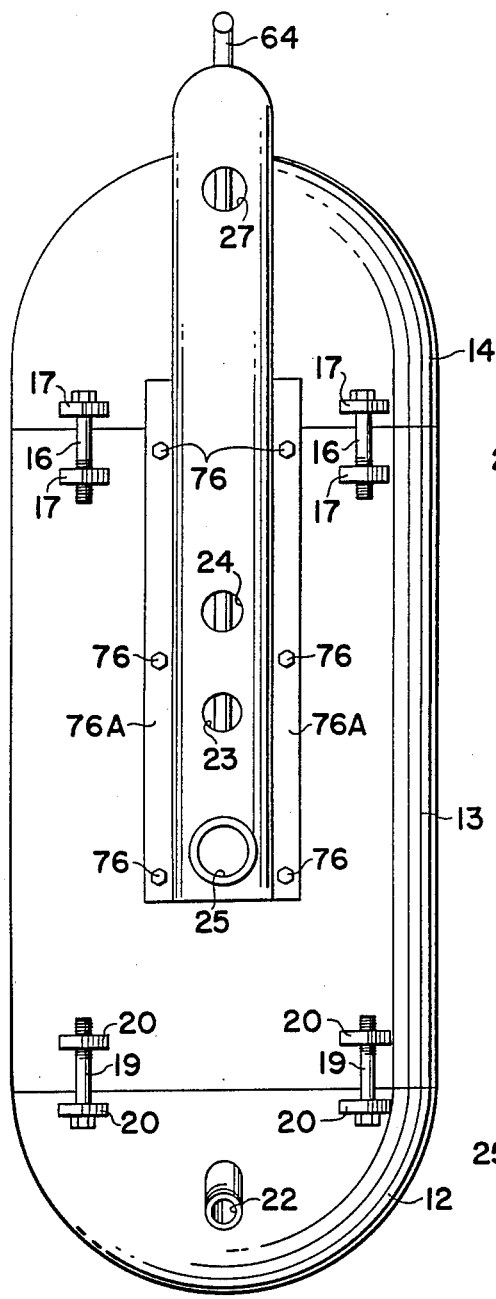
FIG. 5 is a side elevational view of the separator shown in FIG. 1.
Figure 6:
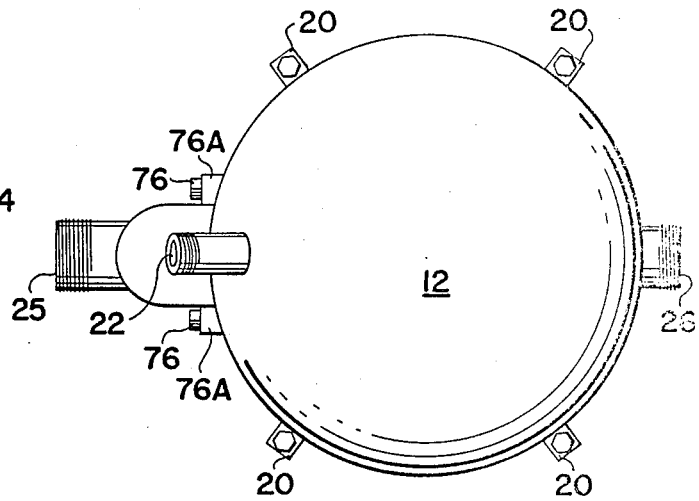
FIG. 6 is a bottom view of the separator shown in FIG. 1.
Figure 7:
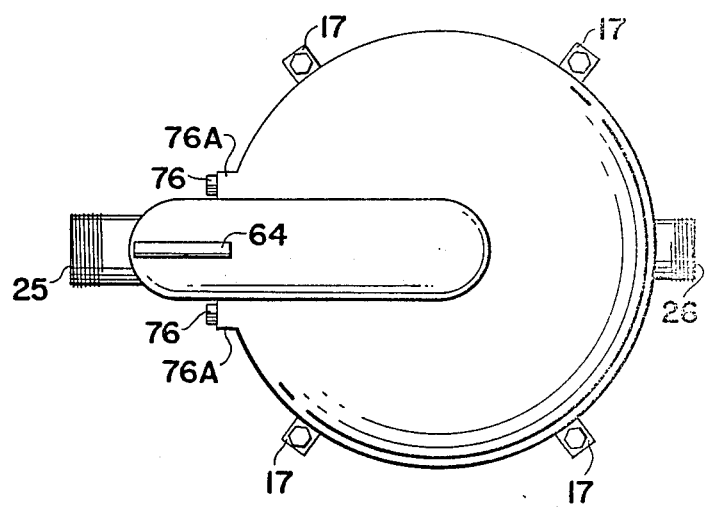
FIG. 7 is a top view of the separator shown in FIG. 1.
Figure 9:
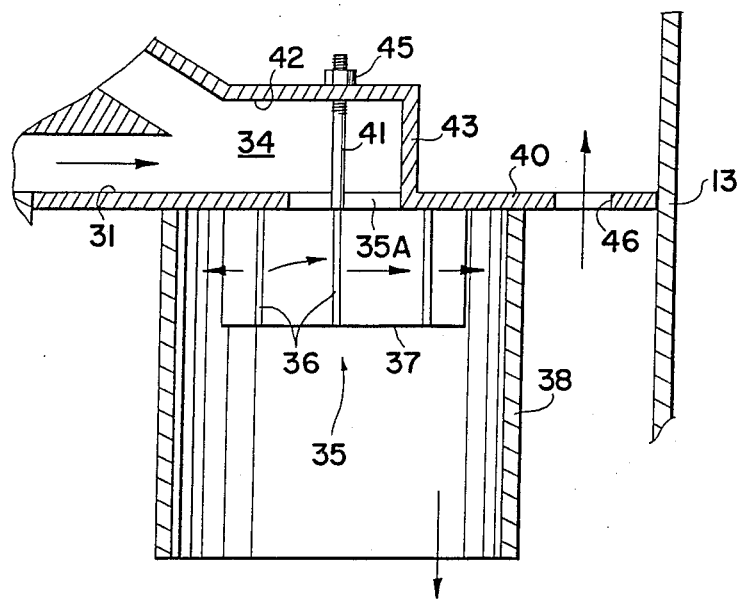
FIG. 9 is an enlarged cross-sectional view of the swirl vanes assembly illustrated in FIG. 8.
Figure 8:
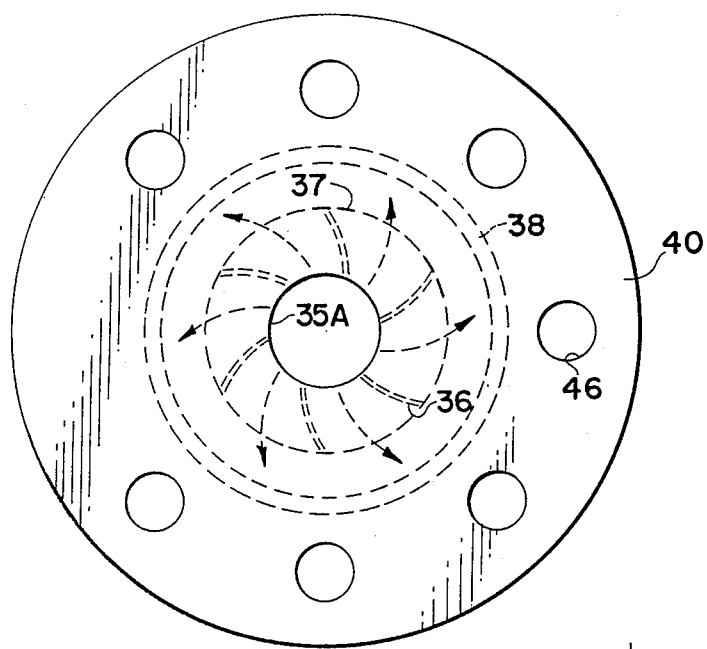
FIG. 8 is an enlarged top plan view of the swirl vanes assembly used in the present invention.
Figure 11:
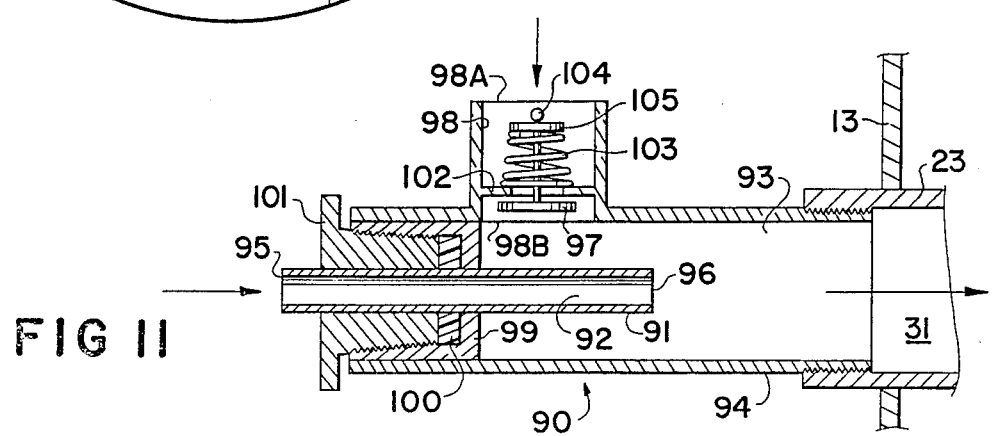
FIG. 11 is an enlarged cross sectional view showing the eductor assembly external of the container of the separator of FIG. 1.

Finally, inlet and outlet manifold 15 is secured to container walls 13 and 14 via flange 76A, which is integral to the side wall 13, and bolts 76 in a conventional manner as clearly shown in FIG. 5. The spool valve 58 may be automatically operated via level-sensing apparatus as is well understood in the art.

As is well understood in the art, different engines have a different mix of gas, solids, and liquid components in the exhaust. Accordingly, the separator 10 can be modified for specific engines and/or applications.

Figure 2:
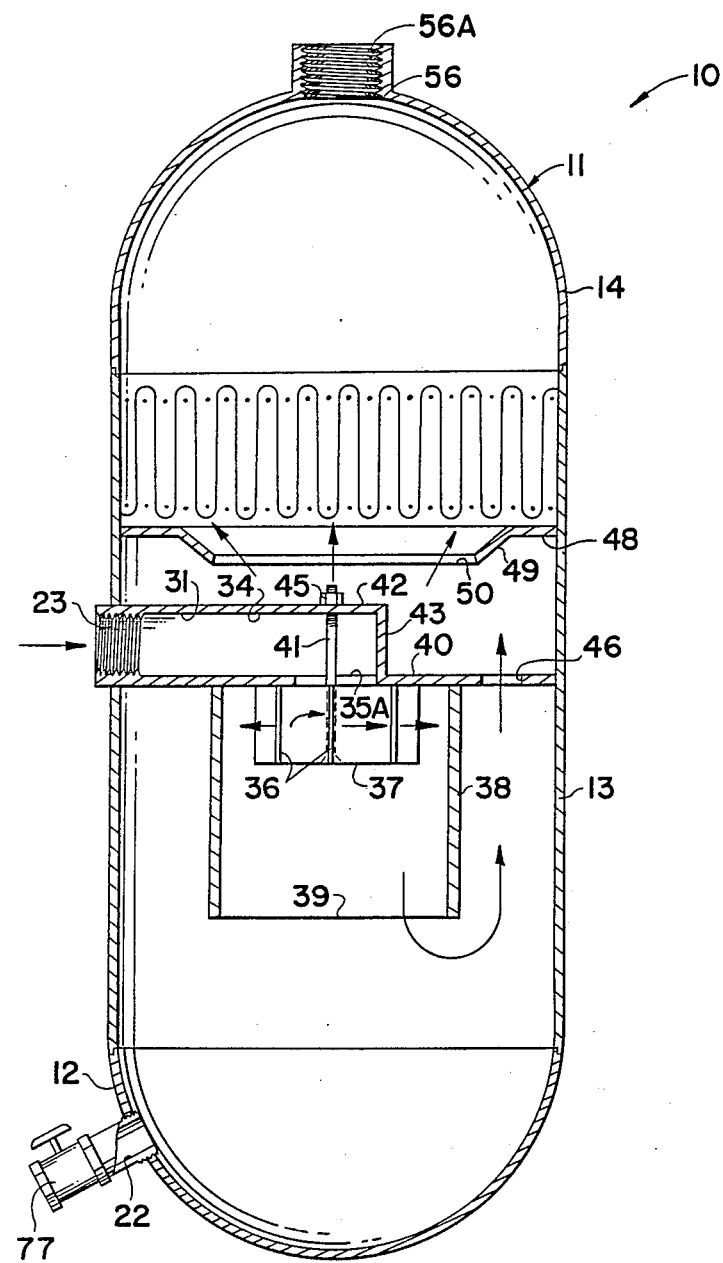
FIG. 2 is a cross-sectional view of the improved gas, liquids, solids separator in accord with a second embodiment of the present invention.

In FIG. 2, a second embodiment of the present invention is illustrated for use with 4-cycle engines. In this embodiment, manifold 15 may be omitted and crankcase exhaust enters directly into chamber 34 via passageway 31 and flows through swirl vanes assembly 35. The airbox inlet 23 can be used as an inlet and no valves are used either at the crankcase inlet 23 or at the gas outlet opening 56 where gas exhaust is directed via outlet 56A to the air intake of the engine. Oil and water is periodically drained manually via valve 77 on drain outlet 22. The operation of this second embodiment is as otherwise described above and basically the gas exhaust is directed through swirl vanes 36 and down and around skirt 38 into and through demister 47 via openings 46 in support plate 40. The eductor assembly 68 and the over flow assembly of float ball 52 are not needed and therefore are omitted.

Figure 3:
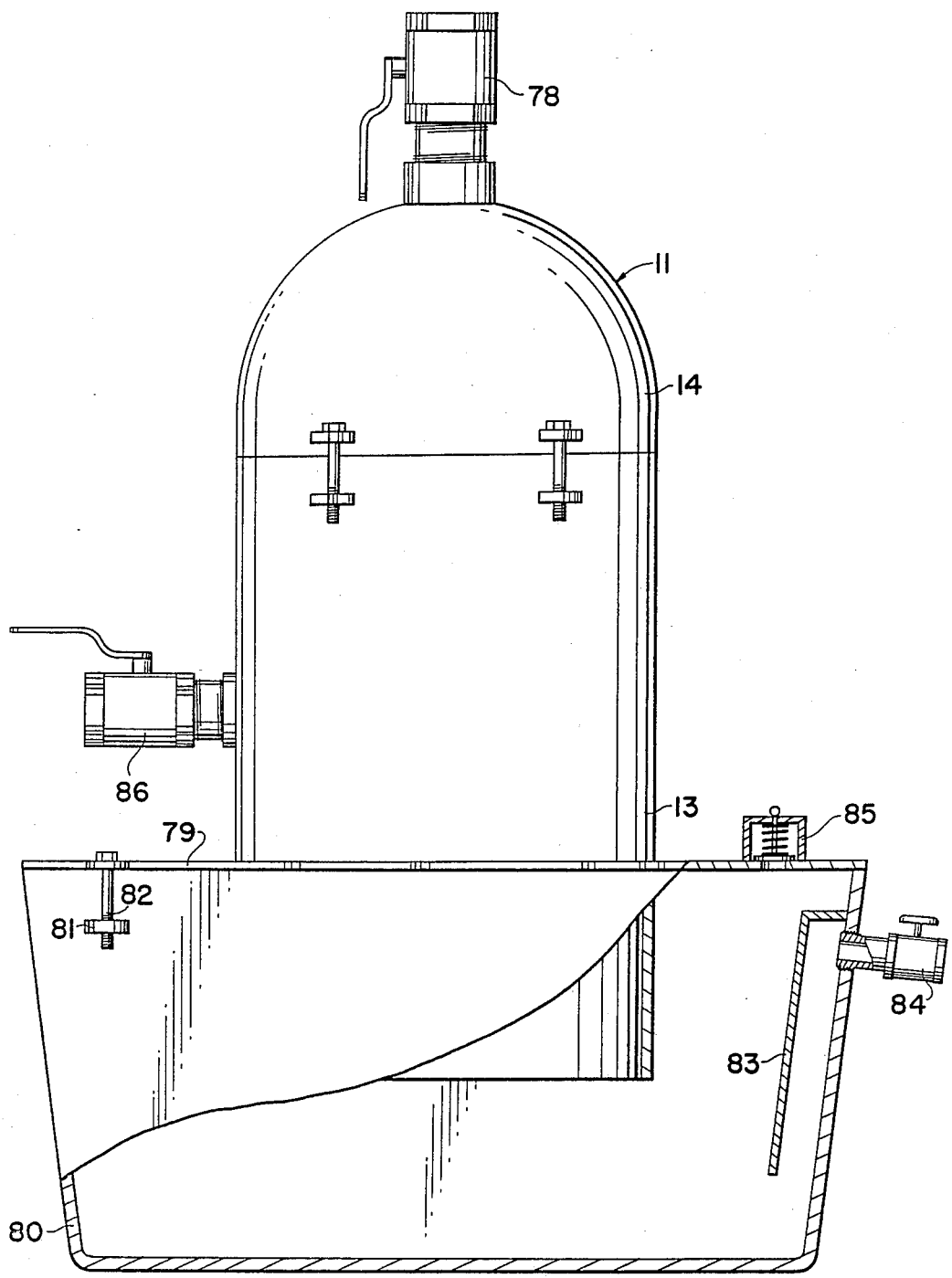
FIG. 3 is a partial cross-sectional view of the improved gas, liquids, solids separator in accord with a third embodiment of the present invention.

In FIG. 3, a third embodiment of the present invention is illustrated for use in 2-cycle diesel engines. Bottom wall 12 of the container of FIGS. 1 and 3 is removed and the remainder of the container is mounted onto an enlarged lower portion of the separator substantially as disclosed in U.S Pat. No. 4,668,254 which has greater liquid capacity. Airbox exhaust, controlled by valve 86, enters passageway 31 where it is directed through the swirl vanes assembly 35 and through demister 47 as described above. Gas exhausts via opening 56 through valve 78. The spool valve 58 may also be used to control exhaust entry and gas flow output if so desired in a given application.

Flange 79 is integral with sidewall 13 for fitting the container 11 onto bottom 80 and securing it thereto via hold-down lugs 81 and bolts 82 in a conventional manner. Oil is removed by closing valve 78, pressurizing container 12 and forcing the oil out via drain tube 83 upon opening of a manually operated isolation valve 84. Pressure relef valve 85 operates to prevent excessive pressure build-up in the container 11.

Figure 4:
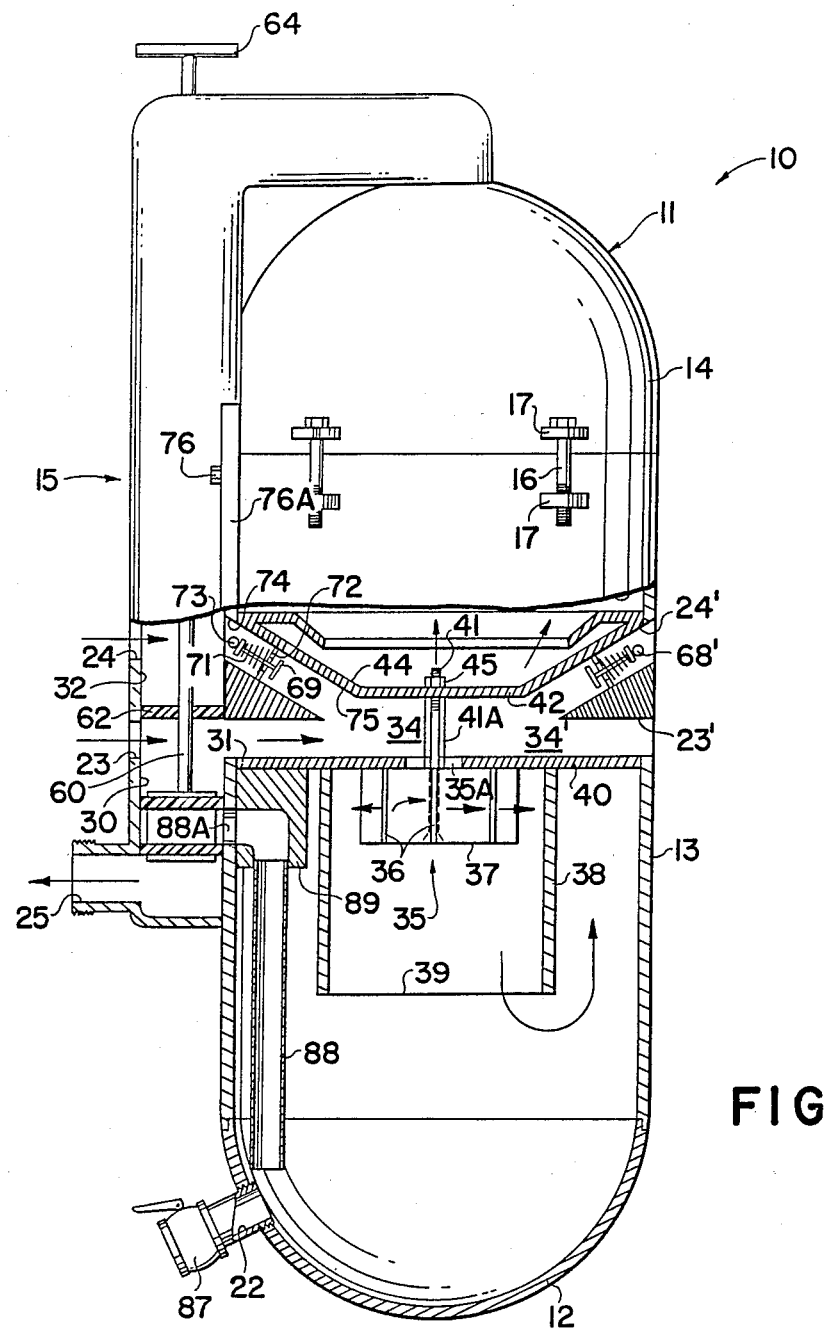
FIG. 4 is a partial cross-sectional view of the improved gas, liquids, solids separator in accord with a fourth embodiment of the present invention.

In FIG. 4, a fourth embodiment of the present invention is illustrated for use with a 2-cycle "V" block engine. Container 11 has two identical eductors 68 and 68'. Two crankcase inlets 24 and 24' are used with two airbox inlets 23 and 23'. Divider 41A is a plate extending across the opening 35A into swirl vanes assembly 35, thus separating the inlet chambers 34 and 34'. The divider 41A inhibits the passage of the exhaust from one inlet chamber from affecting the inlet flow from the other exhausts. Divider 41A is secured into place by bolt 41 and nut 45 or it may be cast as an integral part of support plate 40.

The additional inlets 23' and 24' be controlled via separate valves (not shown) or a modified version of manifold 15. Gas outlet 27 is sufficiently large to handle the entire output from such "V" block engines. Valve 87 on outlet 22 is used to test for the presence of water and/or oil in the container 11 and/or to remove same from the container in the event pressurized withdrawal via 88 and 25 was not desired. Oil normally is removed via oil drain tube 88 which is threaded or welded into boss 89. Boss 89 may be integral with support plate 40 and/or with side wall 13, and has an outlet 88A communicating with oil outlet 25, as clearly shown in FIG. 4.

The overflow control system shown in FIG. 1 comprising ball 52, passageway 51 and outlet 26 and valve 28 may be used in the third and fourth embodiments as may be required in a given application.

Without departing from the invention, the eductor assembly 68 can be physically located outside the container 11, as illustrated in FIG. 1. External eductor assembly 90 is comprised of a small tube 91 (from airbox exhaust) having a passageway 92 therethrough, tube 91 communicates within passageway 93 formed by an extension tube 94 fitted to airbox inlet 23. Airbox exhaust enters passageway 92 via opening 95 and exits into passageway 93 from outlet 96. The exhaust will then expand due to the greater volume of passageway 93 as compared to the volume of passageway 92 and result in a lower pressure therein. Check valve 97 is located within passageway 98 and controls crankcase exhaust flow in response to the differential pressure between crankcase exhaust pressure inlet 98A and the pressure within passageway 93, which is the same pressure at valve outlet 98B. If the differential pressure is sufficiently high, valve 97 opens and allows passage of crankcase exhaust from inlet 98A to valve outlet 98B and into the container 11 via passageway 31. The relative size of the passageways 31, 92 and 93 are chosen for a particular application. Sleeve 99, packing 100, and packig nut 101 provide a pressure seal around tube 91. Check valve 97 is a conventional device having seat 102 and spring 103 which provides a closing bias on valve 97 and thus establishes the differential pressure required to open the valve 97. Spring 103 is secured to rigidly mounted spring base 105 which provides passage for pin-shaped valve stem 104 therethrough as understood in the art.

While the invention has been described with respect to certain specific embodiments, it will be appreciated that many modifications and changes may be made by those skilled in the art without departing from the spirit of the invention. It is intended, therefore by the appended claims to cover all such modifications and changes as fall within the true spirit and scope of the invention.

What is claimed as new and what is desired to secure by Letters Patent of the United States is:

1. An apparatus for separating gas from liquid and solid matter in the exhaust from an interal combustion engine comprising:
   (A) an enclosed container for liquid and solid matter having a top wall, a bottom wall, and side wall and having a first inlet for exhaust, a first outlet for liquid, a second outlet for gas;
   (B) said first exhaust inlet including an exhaust passageway through said side wall and a discharge port located generally centrally inside said container having a swirl vanes device disposed generally horizontallay for suddenly changing the direction of and materially reducing the velocity of and increasing the path of the exhaust being discharged through said port;
   (C) said first liquid outlet including a liquid passageway through said side wall with a shut-off valve in said liquid passageway;
   (D) said second gas outlet including a gas passageway through said top wall;
   (E) filter means spaced below said second gas outlet and disposed horizontally with respect to said side wall to remove entrained liquid and solid matter from the exhaust while passing there-through with the gases passing out said second gas outlet; and
   (F) means for selectively closing said gas passageway in said second gas outlet to raise the pressure of the exhaust in said container, said latter means when closed and said shut-off valve open causing liquid collected in said container to be forced out said liquid passageway by the raised exhaust pressure in said container.

2. The apparatus of claim 1 wherein said swirl vanes device includes a plurality of laterally directed swirl vanes, a base affixed to lower edges of said swirl vanes for directing the exhaust laterally outwardly to cause the exhaust to change direction and increase in volume thereby decreasing its velocity.

3. The apparatus of claim 2 wherein said swirl vanes device further includes a cylindrical skirt mounted concentrically around and spaced laterally outwardly from said swirl vanes, said skirt being suspended from a top partially overlying said swirl vanes for directing exhaust from said vanes downwardly to enhance the separation of the exhaust.

4. The apparatus of claim 3 wherein said top extends horizontally outwardly against said sidewall of said container, said top having a plurality of spaced holes between said skirt and said side wall that allow flow of exhaust upwardly therethrough with the major portion of liquids and solids remaining therebeneath.

5. The apparatus of claim 4 wherein said top is affixed to upper edges of said swirl vanes for supporting said vanes and said base.

6. The apparatus of claim 4 further comprising a bafle mounted below said filter means and extending in overlying position over said holes to cause substantial changes in direction of the exhaust before passing through said filter means.

7. The apparatus of claim 6 wherein said baffle includes a circumferential edge affixed to said side wall and an interior perimeter edge defining an enlarged opening extending laterally inward a sufficient distance to change the direction of the exhaust passing upwardly through said holes prior to passing into said filter means through said enlarged opening.

8. The apparatus of claim 7 wherein said baffle further comprises an interiorly disposed downwardly tapered portion defining said opening for increasing the flow path of exhaust from said flow holes.

9. The apparatus of claim 1 wherein said swirl vanes device includes a plurality of laterally directed swirl vanes, a circular base affixed to the lower edges of said swirl vanes, a circular plate affixed to the upper edges of said swirl vanes and having an opening in a central portion thereof, said circular plate mounted against said side wall and having a plurality of spaced holes located near the perimeter thereof, a cylindrical skirt integral with and extending downwardly from said plate, the perimeter of said skirt located inward of said holes.

10. The apparatus as in claim 1 wherein the means for selective closing of said gas passageway in said second gas outlet comprises spool valve means, said spool valve means including a disk and a handle operatively connected to said disk such that when said handle is lifted vertically said disk closes said gas passageway.

11. The apparatus as in claim 1 wherein said liquid passageway comprises a vertically disposed cylindrical tube with an upper opening communicating with said liquid outlet and a lower opening for receiving liquid collecting within said container.

12. The apparatus of claim 1 further including a third outlet for liquid having a liquid passageway through said top wall with a shutoff valve on the outlet of said passageway and a flow control valve on the inlet of said passageway, said inlet forming a seat for said flow control valve.

13. The apparatus of claim 12 wherein said flow control valve is a floatable ball valve, said ball valve rising off said seat when a sufficiently high liquid level exists in said container for allowing liquid flow said liquid passageway.

14. An apparatus for separating gas from liquid and solid matter in the exhaust from an internal combustion engine having crankcase ventilation exhaust and airbox drain exhaust comprising:
   A. an enclosed container for liquid and solid matter having a top wall, a bottom wall, and side wall and having a first inlet for a first exhaust, a second inlet for a second exhaust, a first outlet for liquid, a second outlet for gas;

B. said first exhaust inlet including a first exhaust passageway through said side wall and a discharge port located generally centrally inside said container having a means for suddenly changing the direction of and materially reducing the velocity of the first exhaust being discharged through said port; said discharge port having an inlet chamber for materially reducing the exhaust pressure therein;

C. said second exhaust inlet including a second exhaust passageway through said side wall for directing the second exhaust into said inlet of said discharge port; said second exhaust passageway including check valve means for controlling the passage of said second exhaust therethrough, said second exhaust entering said inlet of said discharge port when the second exhaust is at a sufficiently high pressure to open said check valve means with the assistance of a low pressure created in said inlet of said discharge port by the first exhaust passing therethrough;

D. said first liquid outlet including a first liquid passageway through said side wall with a shutoff valve in said passageway;

E. said second gas outlet including a gas passageway through said top wall;

F. filter means spaced between said second gas outlet and said first and second exhaust inlets disposed horizontally with respect to said side wall of said container to remove entrained liquid and solid matter from the first and second exhaust when passing therethrough with the gas passing out said second gas outlet; and G. a means for selectively closing said gas passageway in said second gas outlet to raise the pressure of the exhaust in said container, said latter means when closed and said shut-off valve open causing liquid collected in said container to be forced out said liquid passageway by the raised exhaust pressure in said container.

15. The apparatus of claim 14 wherein said check valve means comprises a seat, a circular disk, biasing means connected to said disk for normally biasing said disk toward and seated on said seat.

16. The apparatus of claim 14 wherein the means for suddenly changing the direction of and materially reducing the velocity of and increasing the path of the exhaust being discharged through said port comprises a swirl vanes device.

17. The apparatus of claim 16 wherein said swirl vanes device includes a plurality of laterally directed swirl vanes, a base affixed to lower edges of said swirl vanes for directing the exhaust laterally outwardly to cause the exhaust to change direction and increase in volume thereby decreasing its velocity.

18. The apparatus of claim 17 wherein said swirl vanes device further includes a cylindrical skirt mounted concentrically around and spaced laterally outward from said swirl vanes, said skirt being suspended from a top partially overlying said swirl vanes for directing exhaust from said vanes downwardly to enhance the speration of the exhaust.

19. The apparatus of claim 18 wherein said top extends horizontally outwardly against said side wall of said container, said top having a plurality of spaced holes between said skirt and said side wall that allow flow of exhaust upwardly therethrough with the major portion of liquids and solids remaining therebeneath.

20. The apparatus of claim 14 wherein said container includes a third outlet for liquid, said third outlet including a third liquid passageway, a flow control means for controlling liquid flow into said third liquid passageway, and a flow shutoff means downstream of said flow control means in said third liquid passageway.

21. The apparatus as in claim 20 wherein said flow control means includes a floatable ball valve, an inlet of said third liquid passageway forming a seat for said ball valve, said ball being lifted from said seat when a sufficiently high liquid level exists in said container for allowing liquid passage through said third liquid passageway.

22. The apparatus of claim 19 further comprising a baffle mounted below said filter means and extending in overlying position over said holes to cause substantial changes in direction of the exhaust before passing through said filter means.

23. The apparatus of claim 22 wherein said baffle includes a circumferential edge affixed to said side wall and an interior perimeter edge defining an enlarged opening extending laterally inward a sufficient distance to change the direction of the exhaust passing upwardly through said holes prior to passing into said filter means through said enlarged opening.

24. The apparatus of claim 23 wherein said baffle further comprises an interiorly disposed downwardly tapered portion defining said opening for increasing the flow path of exhaust from said holes.

25. The apparatus of claim 14 further including an inlet and exhaust manifold, said manifold comprising valve control means for selectively controlling the flow through said first liquid outlet and said second gas outlet.

26. The apparatus of claim 25 wherein said valve control means comprises a spool valve having a first upper disk for selectively opening and closing said second gas passageway in said second gas outlet and a second lower disk for selectively opening and closing said first liquid passageway, said disks cooperating such that as said upper disk is operated to close said second gas passageway said second disk opens said first liquid passageway.

27. An apparatus for separating gas from liquid and solid matter in the exhaust from an internal combustion engine having crankcase ventilation or drains comprising:

A. An enclosed container for liquid and solid matter having a top wall, a bottom wall, and side wall, and a first outlet for liquid, a second outlet for gas, a first inlet for exhaust, said first inlet including an exhaust passageway through said side wall and a discharge port inside said container having a means for suddenly changing the direction of and materially reducing the velocity of exhaust being discharged through said port;

B. An eductor means comprising a first exhaust inlet passageway and an outlet chamber for reducing the pressure therein, a second exhaust inlet passageway discharging into said outlet chamber, check valve means in said second exhaust inlet passageway for controlling the entrance of the second exhaust into said outlet chamber, said second exhaust entering said outlet chamber when the second exhaust is at a sufficiently high pressure to open said check valve means with the assistance of a low pressure created in said outlet chamber by the passage of the first exhaust therethrough, said outlet chamber discharging into said first inlet;

C. said first liquid outlet including a liquid passageway through said side wall with a shutoff valve in said passageway;

D. said second gas outlet including a passageway through said top wall;

E. filter means to remove entrained liquid and solid matter from the first and second exhaust while passing therethrough with the gas passing out said second gas outlet; and F. a means for selectively closing said gas passageway in said second gas outlet to raise the pressure of the exhaust in said container.

28. An apparatus for separting gas from liquid and solid matter in the exhaust from an internal combustion engine having crankcase ventilation or drains comprising:

A. An enclosed container for liquid and solid matter having a top wall, a bottom wall, and side wall and having an engine exhaust inlet, a pressurized crankcase exhaust inlet, a liquid outlet, and a gas out let;

B eductor means in said container for receiving the engine exhaust and crankcase exhaust and reducing the pressure of the engine exhaust at the outlet thereof, the crankcase exhaust entering said outlet of said eductor means when a sufficiently high differential pressure exists between crankcase exhaust and said outlet of said eductor means, spring-biased check valve means for controlling the entrance of said crankcase exhaust said spring-bias establishing the differential pressure required to open said check valve means;

C. means in said container for suddenly changing the direction of and materially reducing the velocity of exhaust entering said container from said outlet of said eductor means;

D. said liquid outlet including an outlet liquid passageway through said side wall with a shutoff valve in said passageway;

E. said gas outlet including a gas passageway through said top wall;

F. filter means to remove entrained liquid and solid matter from the exhaust while passing therethrough with the gas passing out said gas outlet;

G. means for selectively closing said gas passageway to raise the pressure of the exhaust in said container.

29. The apparatus of claim 28 wherein said means for suddenly changing the direction of and materially reducing the velocity of exhaust entering said container comprises a swirl vanes device having a plurality of laterally directed swirl vanes and a base affixed to the lower edges of said swirl vanes for directing exhaust laterally outward, said vanes device further including a top extending horizontally outwardly against said side wall of said container, said swirl vanes suspended from said top, said top having a plurality of spaced holes outwardly of said swirl vanes for passage of exhaust upwardly therethrough.

30. The apparatus of claim 29 wherein said swirl vanes device further includes a cylindrical skirt mounted concentrically around and spaced laterally outward from said swirl vanes, said skirt being suspended from said top for directing exhaust from said vanes downwardly to enhance the separation of the exhaust.

31. The apparatus for separating gas from liquid and solid matter in the exhaust of an internal combustion engine having crankcase ventilation or drains comprising:

A. an enclosed container for liquid and solid matter having a top wall, a bottom wall, and side wall, and having a first and second air box exhaust inlet, a first and second crankcase exhaust inlet, a liquid outlet, and a gas outlet;

B. first and second efuctor means in said container for receiving the first and second air box exhaust respectively and reducing the pressure at the outlet thereof, the first and second crankcase exhaust entering the outlet of said first and second eductor means respectively when a sufficiently high differential pressure exists between the crankcase exhaust and said outlet of the associated eductor means, spring-biased check valve means between the crankcase exhaust and the said outlet of the associated eductor means for controlling the entrance of the respective crankcase exhaust, said spring bias establishing the differential pressure required to open said check valve means;

C. means in said container for suddenly changing the direction of and materially reducing the velocity of exhaust entering said container from said outlets of said eductor means;

D. said liquid outlet including an outlet liquid passageway through said side wall with a shutoff valve in said passageway;

E. said gas outlet including a gas passageway through said top wall, filter means to remove entrained liquid and solid matter from the exhaust while passing therethrough with the gas passing out said gas outlet;

F. means for selectively closing said gas passageway to raise the pressure of the exhaust in said container.

32. The apparatus of claim 31 wherein said means for suddenly changing the direction of and materially reducing the velocity of exhaust entering said container comprises a swirl vanes device having a plurality of laterally directed swirl vanes and a base affixed to the lower edges of said swirl vanes for directing exhaust laterally outward, said swirl vanes device further including a top extending horizontally outwardly against said side wall of said container, said swirl vanes suspended from said top, said top having a plurality of spaced holes outwardly of said swirl vanes for passage of exhaust upwardly therethrough, said swirl vanes further including a cylindrical skirt mounted concentrically around and spaced laterally outward from said swirl vanes, said skirt being suspended from said top for directing exhaust from said vanes downwardly to enhance the separation of the exhaust.

33. The apparatus of claim 31 wherein said outlets of said eductor means form a chamber, said chamber having a partition thereacross for separating the exhaust of one said outlet from the other said outlet.

34. The apparatus of claim 14 further including an inlet and exhaust manifold, said manifold comprising spool valve means having a handle for selectively controlling the flow through said first liquid outlet and said second gas outlet, said spool valve means comprising a lower valve disk for selectively opening said first liquid outlet, an upper valve disk for selectively closing said second gas outlet, said lower valve disk and said upper valve disk operatively connected such that when said spool valve handle is operated to close said second gas passageway to increase the pressure within said container, said first liquid outlet is opened, liquid in said container flowing therethrough.

35. The apparatus of claim 14 wherein said first and second inlets and said first and second outlets are vertically aligned, said apparatus further including an inlet and exhaust manifold mounted on said container and having an opening associated with each said inlet and outlet, spool valve means including a handle, said spool valve means vertically movable within said manifold, said spool valve means having a first disk for selectively controlling passage of gas through said gas outlet, a second disk for isolating said first inlet from said second inlet, a third disk for isolating said liquid outlet from said first inlet, a fourth disk for selectively controlling passage of liquid through said liquid outlet, said disks mounted in fixed relative position on a vertical rod having an upper end portion passing through said manifold, said rod connected to said handle.

36. The apparatus of claim 35 wherein said first disk and said second disk define a chamber within said manifold, said chamber communicating with said gas outlet when flow through said gas passageway is closed by said first disk for allowing passage of exhaust entering said chamber from said inlet associated with second inlet to flow through said gas outlet.

37. The apparatus of claim 36 wherein said chamber communicates with said gas outlet when said spool valve is operated to allow liquid flow through said liquid outlet.

38. The apparatus of claim 36 wherein said chamber communicates with said gas outlet whenever said gas outlet is not fully open.

* * * * *